United States Patent
Keret et al.

(10) Patent No.: US 10,592,649 B2
(45) Date of Patent: Mar. 17, 2020

(54) AUTHENTICATION VIA A DYNAMIC PASSPHRASE

(71) Applicant: Nice Ltd., Ra'anana (IL)

(72) Inventors: Matan Keret, Oulu (FI); Amnon Buzaglo, Karkur (IL)

(73) Assignee: NICE LTD., Ra'anana (IL)

( * ) Notice: Subject to any disclaimer, the term of this patent is extended or adjusted under 35 U.S.C. 154(b) by 145 days.

(21) Appl. No.: 15/672,518

(22) Filed: Aug. 9, 2017

(65) Prior Publication Data
US 2019/0050545 A1 Feb. 14, 2019

(51) Int. Cl.
| | | |
|---|---|---|
| G10L 17/00 | (2013.01) | |
| G10L 17/04 | (2013.01) | |
| G10L 17/24 | (2013.01) | |
| H04L 9/32 | (2006.01) | |
| G06F 21/32 | (2013.01) | |
| G10L 17/14 | (2013.01) | |
| H04L 29/06 | (2006.01) | |

(52) U.S. Cl.
CPC ............. G06F 21/32 (2013.01); G10L 17/24 (2013.01); *G06F 2221/2103* (2013.01); *G10L 17/005* (2013.01); *G10L 17/14* (2013.01); *H04L 63/0861* (2013.01)

(58) Field of Classification Search
CPC ... G06F 21/32; G06F 2221/21; G10L 17/005; G10L 17/14; G10L 17/24; G10L 17/04; G10L 17/06; H04L 63/0861
See application file for complete search history.

(56) References Cited

U.S. PATENT DOCUMENTS

| | | | | |
|---|---|---|---|---|
| 4,773,093 A | * | 9/1988 | Higgins | G10L 17/02 704/247 |
| 5,897,616 A | * | 4/1999 | Kanevsky | G10L 17/24 379/88.02 |
| 6,094,632 A | * | 7/2000 | Hattori | G10L 17/24 379/88.01 |
| 7,822,605 B2 | * | 10/2010 | Zigel | G10L 17/06 704/246 |
| 8,396,711 B2 | * | 3/2013 | Yee | G10L 17/24 379/88.01 |

(Continued)

OTHER PUBLICATIONS

Gibbons, John, et al. "Voiceprint Biometric Authentication System." 2014. (Year: 2014).*

*Primary Examiner* — Michael Simitoski
(74) *Attorney, Agent, or Firm* — Pearl Cohen Zedek Latzer Baratz LLP

(57) ABSTRACT

A computerize method for voice authentication of a customer in a self-service system is provided. A request for authentication of the customer is received and the customer is enrolled in the self-service system with a text-independent voice print. A passphrase from a plurality of passphrases to transmit to the customer is determined based on comparing each of the plurality of passphrases to a text-dependent or text-independent voice biometric model. The passphrase is transmitted to the customer, and when the customer responds, an audio stream of the passphrase is received. The customer is authenticated by comparing the audio stream of the passphrase against the text-independent voice print. If the customer is authenticated, then storing the audio stream of the passphrase and the topic of the passphrase.

13 Claims, 4 Drawing Sheets

(56) References Cited

U.S. PATENT DOCUMENTS

| | | | |
|---|---|---|---|
| 8,543,834 B1* | 9/2013 | Barra | G06F 21/32 713/182 |
| 9,154,629 B2* | 10/2015 | John | G06F 16/685 |
| 9,363,265 B2* | 6/2016 | White | H04C 63/0861 |
| 9,479,501 B2* | 10/2016 | White | H04L 63/0861 |
| 10,019,561 B1* | 7/2018 | Shelton | G10L 17/00 |
| 10,102,359 B2* | 10/2018 | Cheyer | G06F 21/32 |
| 10,127,911 B2* | 11/2018 | Kim | G10L 17/26 |
| 2003/0110034 A1* | 6/2003 | Runge | G10L 17/04 704/246 |
| 2003/0161503 A1* | 8/2003 | Kramer | G06Q 20/04 382/115 |
| 2003/0233231 A1* | 12/2003 | Fellenstein | G10L 17/22 704/246 |
| 2005/0069095 A1* | 3/2005 | Fellenstein | H04M 3/533 379/88.02 |
| 2005/0096906 A1* | 5/2005 | Barzilay | G06Q 30/06 704/249 |
| 2006/0106605 A1* | 5/2006 | Saunders | G10L 17/04 704/246 |
| 2006/0188076 A1* | 8/2006 | Isenberg | H04M 3/385 379/88.02 |
| 2006/0277043 A1* | 12/2006 | Tomes | G10L 17/04 704/247 |
| 2008/0256613 A1* | 10/2008 | Grover | G06F 21/32 726/5 |
| 2008/0300877 A1* | 12/2008 | Gilbert | G06Q 40/00 704/246 |
| 2009/0055193 A1* | 2/2009 | Maislos | G06F 21/32 704/273 |
| 2009/0187405 A1* | 7/2009 | Bhogal | G10L 17/00 704/246 |
| 2009/0259470 A1* | 10/2009 | Chang | G10L 17/22 704/246 |
| 2010/0106502 A1* | 4/2010 | Farrell | G07C 9/00158 704/246 |
| 2010/0131273 A1* | 5/2010 | Aley-Raz | G10L 17/24 704/247 |
| 2010/0153110 A1* | 6/2010 | Chang | G10L 15/10 704/248 |
| 2010/0228656 A1* | 9/2010 | Wasserblat | G06Q 10/10 705/35 |
| 2010/0268537 A1* | 10/2010 | Al-Telmissani | G10L 17/04 704/246 |
| 2011/0246196 A1* | 10/2011 | Bhaskaran | G10L 17/24 704/235 |
| 2012/0130714 A1* | 5/2012 | Zeljkovic | G10L 17/24 704/235 |
| 2012/0245941 A1* | 9/2012 | Cheyer | G06F 21/32 704/246 |
| 2012/0249328 A1* | 10/2012 | Xiong | G10L 15/22 340/541 |
| 2012/0284026 A1* | 11/2012 | Cardillo | G10L 17/08 704/246 |
| 2013/0097682 A1* | 4/2013 | Zeljkovic | H04L 9/3231 726/7 |
| 2013/0132091 A1* | 5/2013 | Skerpac | G10L 17/005 704/273 |
| 2013/0163743 A1* | 6/2013 | Henry | H04M 3/42068 379/218.01 |
| 2013/0225128 A1* | 8/2013 | Gomar | H04W 12/06 455/411 |
| 2013/0226582 A1* | 8/2013 | Aley-Raz | G10L 17/24 704/247 |
| 2013/0232073 A1* | 9/2013 | Sheets | G06Q 20/40145 705/44 |
| 2014/0188468 A1* | 7/2014 | Dyrmovskiy | G10L 17/04 704/235 |
| 2014/0222678 A1* | 8/2014 | Sheets | G06Q 20/40145 705/44 |
| 2014/0330563 A1* | 11/2014 | Faians | G06O 30/0185 704/236 |
| 2014/0348308 A1* | 11/2014 | Krause | G10L 17/00 379/88.02 |
| 2015/0056952 A1* | 2/2015 | Mintz | H04M 1/72569 455/411 |
| 2015/0095028 A1* | 4/2015 | Karpey | G10L 17/26 704/246 |
| 2015/0112680 A1* | 4/2015 | Lu | G10L 17/04 704/244 |
| 2015/0178487 A1* | 6/2015 | Hu | G06F 21/32 726/19 |
| 2015/0187359 A1* | 7/2015 | Bhaskaran | G10L 17/24 704/235 |
| 2015/0326571 A1* | 11/2015 | Gomar | H04W 12/06 726/6 |
| 2016/0203821 A1* | 7/2016 | Zeljkovic | G10L 17/24 704/247 |
| 2016/0330198 A1* | 11/2016 | Stern | G06F 21/32 |
| 2016/0365095 A1* | 12/2016 | Lousky | G10L 17/04 |
| 2016/0372121 A1* | 12/2016 | Li | G10L 17/04 |
| 2017/0194004 A1* | 7/2017 | Lousky | H04L 63/0861 |
| 2017/0214687 A1* | 7/2017 | Klein | H04L 63/0861 |
| 2017/0221488 A1* | 8/2017 | Xiong | G10L 17/00 |
| 2018/0040325 A1* | 2/2018 | Melanson | G10L 17/06 |
| 2018/0090148 A1* | 3/2018 | Jaiswal | G10L 17/005 |
| 2018/0122369 A1* | 5/2018 | Taira | G10L 15/1815 |
| 2018/0152446 A1* | 5/2018 | Gomar | H04W 12/06 |
| 2018/0293988 A1* | 10/2018 | Huang | G10L 17/20 |
| 2018/0366125 A1* | 12/2018 | Liu | G10L 17/04 |
| 2019/0012449 A1* | 1/2019 | Cheyer | G06F 21/32 |

* cited by examiner

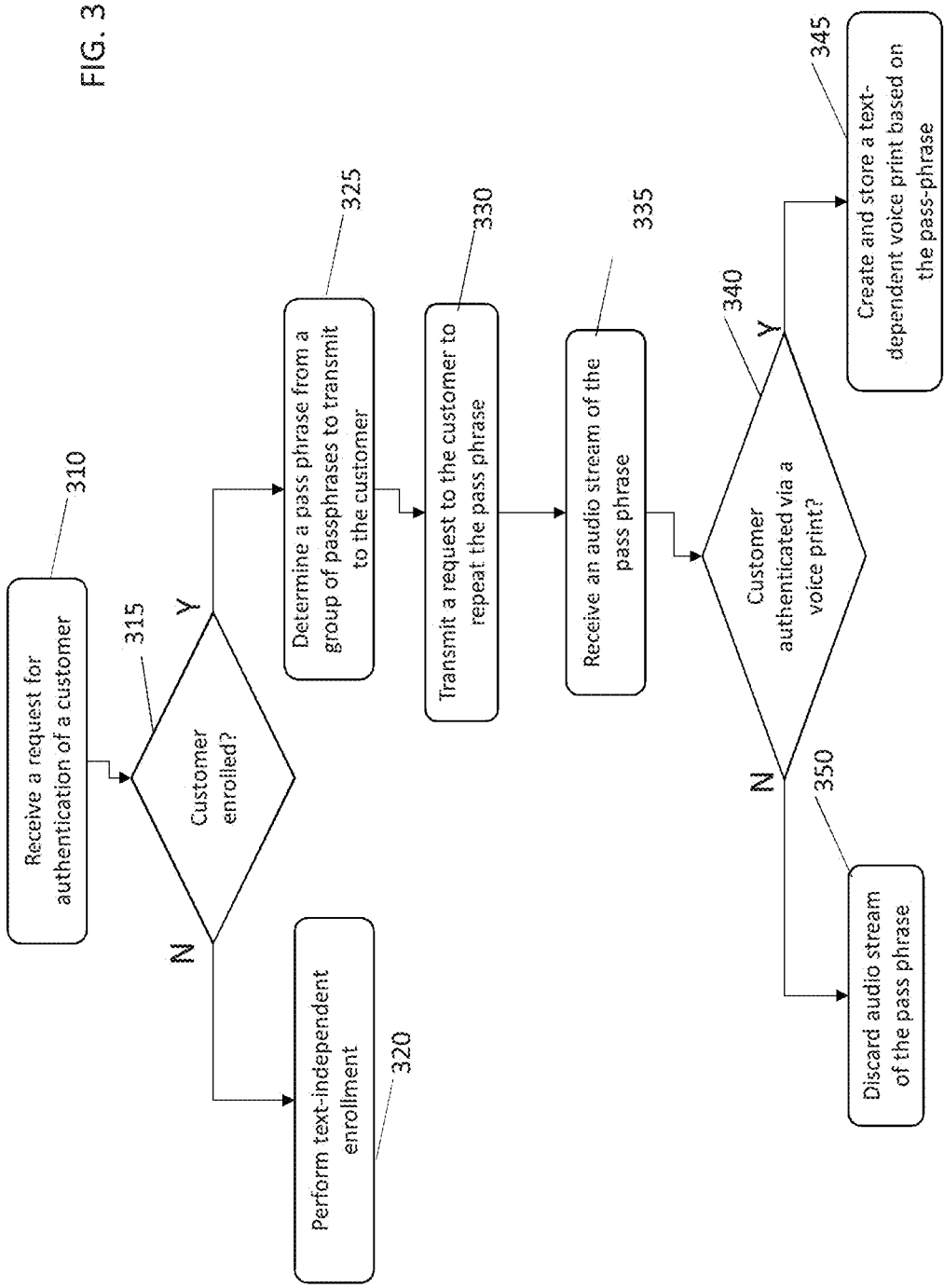

AUTHENTICATION VIA A DYNAMIC PASSPHRASE

FIELD OF THE INVENTION

The invention relates generally to the field of authentication of individuals. In particular, the invention relates to the authentication of individuals using their voices.

BACKGROUND OF THE INVENTION

Large organizations, such as commercial organizations, financial institutions, government agencies or public safety organizations conduct numerous interactions (i.e., communication sessions) with customers, users, suppliers and the like on a daily basis. Many of these interactions are vocal or at least comprise a vocal or audio component, for example, voices of parties to a telephone call or the audio portion of a video or a face-to-face interaction. A significant part of these interactions takes place between a customer and a representative of the organization, e.g., an agent in a contact center.

Communication sessions can involve exchanging sensitive information, for example, financial data, transactions and personal medical data, thus the agent is required to authenticate the identity of the customer, before offering the customer any assistance or services. When a communication session begins the system or an agent first identifies the customer, for example based on the customer's name, telephone number, ID number, Social Security number or Postal Index Number (PIN) code and later authenticates the identity of the customer. Traditional systems and methods use knowledge-based information also known as, Know Your Client (KYC) information, such as personal information known only to the client that was previously stored in the organization database (e.g., the name of your pet, your old school, the marriage data of your parents, etc.). Some organizations use secret pass key(s) or even physical characteristics of the person, for example, fingerprints and voice prints to authenticate the customer identity.

Voice prints or voice biometric data also known as spectrograms, spectral waterfalls, sonograms, or voicegrams, are time-varying spectral representations of sounds or voices. Digital voice prints can be created from any digital audio recording of voices, for example, audio recordings of communications sessions between agents and customers. A voice print can be generated by applying short-time Fourier transform (STFT) on various (preferably overlapping) audio streams of the audio recording (segment). A three-dimensional image of the voice print can present measurements of magnitude versus frequency for a specific moment in time. A speaker's voice is extremely difficult to forge for biometric comparison purposes, since a myriad of qualities are measured ranging from dialect and speaking style to pitch, spectral magnitudes, and format frequencies. The vibration of a user's vocal chords and the patterns created by the physical components resulting in human speech are as distinctive as fingerprints. Voice prints of two individuals can differ from each other at about one hundred (100) different points.

Voice prints can be used to authenticate a user (e.g., customer). In some systems a passphrase is used to authenticate the user. For example, when a user in enrolled in a system, the system can prompt the user to input a passphrase (e.g., answer a specific question or repeat a particular phrase, for example, "my voice is my password"). A text-dependent voice print of an audio response of the user can be created, such that after enrollment, upon subsequent authentication, the user is prompted with the passphrase for authentication. One difficulty with current approach is that a fraudster knowing the passphrase can obtain a recording of the user repeating the passphrase, and play the recording to authenticate and obtain access to the user's request.

Therefore, it can be desirable to prevent a fraudster from stealing a user's passphrase.

SUMMARY OF THE INVENTION

Some advantages of the invention can include preventing a fraudster from stealing a user's passphrase and/or generating a dynamic passphrase without requiring an additional step in the user's experience to generate new passphrases. Another advantage of the invention can be that passphrases can be changed dynamically, without compromising accuracy of the biometric comparison. Another advantage of the invention can be transferring from text-independent to text-dependent biometric comparisons. Another advantage of the invention can be that the passphrase can be changed without limit on the amount of dynamically changing passphrases over time.

In one aspect, the invention involves a computer-implemented method for voice authentication of a customer in a self-service system. The method also involves receiving a request for authentication of the customer, the customer is enrolled in the self-service system with a text-independent voice print. The method also involves determining a passphrase from a plurality of passphrases to transmit to the customer based on comparing each of the plurality of passphrases to a text-dependent or text-independent voice biometric model. The method also involves transmitting a request to the customer to repeat the passphrase. The method also involves receiving an audio stream of the passphrase. The method also involves authenticating the customer by comparing the audio stream of the passphrase against the text-independent voice print and if the customer is authenticated, then storing the audio stream of the passphrase and the topic of the passphrase.

In some embodiments, the method also involves upon receipt of a subsequent request for authentication of the customer, determining another passphrase that is different from the previous passphrase. In some embodiments, the method also involves for each subsequent request for authentication, presenting the customer with a unique passphrase of the plurality of passphrases and storing an audio stream of each corresponding unique passphrase as recited by the customer.

In some embodiments, the method also involves determining the passphrase further comprises selecting the passphrase from the plurality of passphrases such that the same passphrase is not used more than a minimum number of reuse times. In some embodiments, the method involves determining the passphrase further comprising combining two or more passphrases from the plurality of passphrases.

In some embodiments, for each passphrase in the group of passphrases that is transmitted to the customer a maximum number of use times, deleting the corresponding passphrases from the plurality of passphrases. In some embodiments, the plurality of passphrases is input by a user.

In some embodiments, the plurality of passphrases is automatically populated. In some embodiments, the plurality of passphrases is updated. In some embodiments, the plurality of passphrases is updated when more than a predefined percentage of customers of a system that executed the method are enrolled with the same passphrases. In some embodiments, the method involves updating the plurality of passphrases based on computerized text.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, can best be understood by reference to the following detailed description when read with the accompanying drawings in which:

FIG. 3 is a flowchart of a method for transforming a text-independent enrollment of a customer in a self-service system into a text-dependent enrollment according to some embodiments of the present invention.

Figure 1:
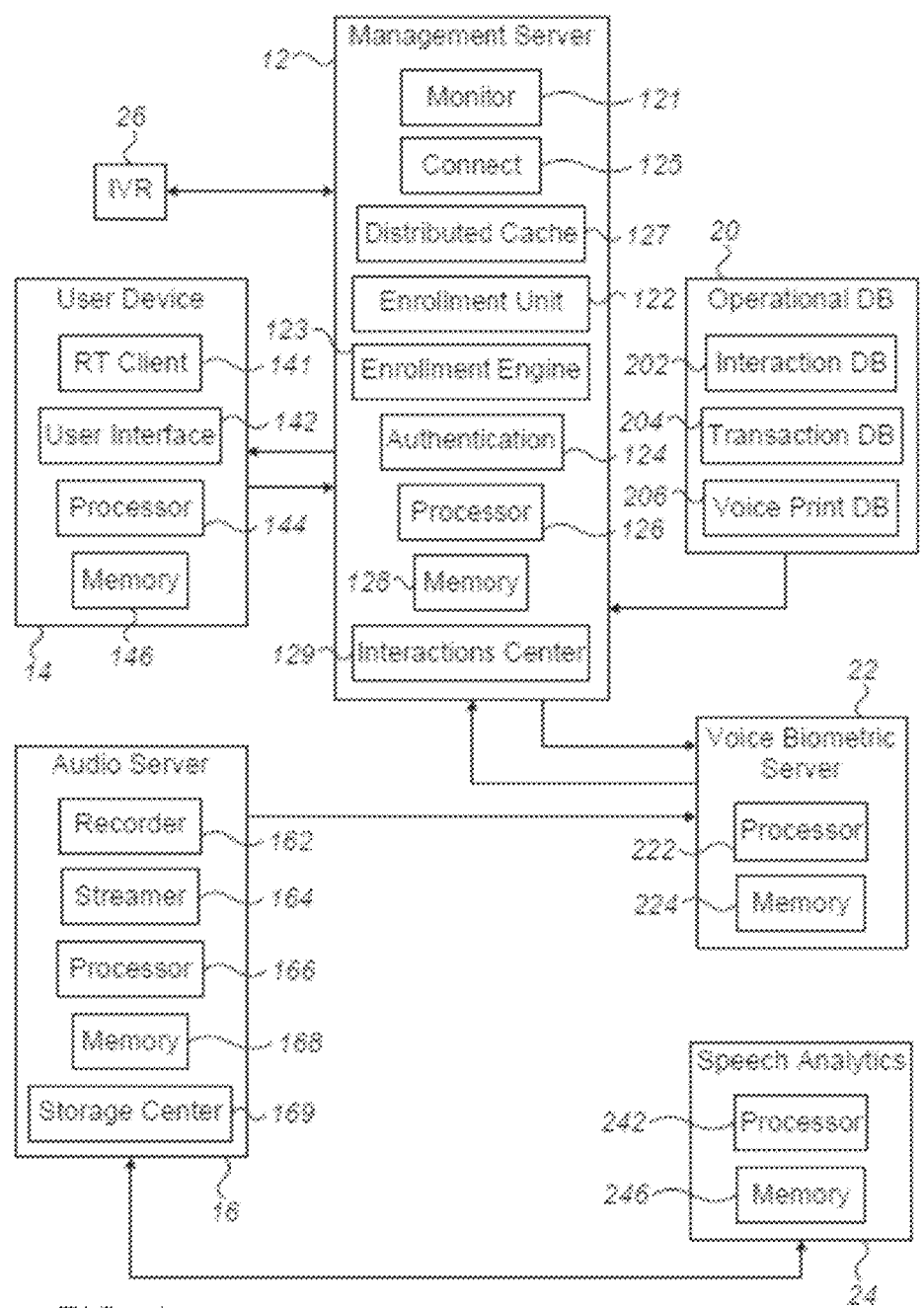
FIG. 1 is a block diagram of a system for authenticating and enrolling customers according to some embodiments of the present invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element. Further, where considered appropriate, reference numerals can be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Although some embodiments of the invention are not limited in this regard, unless specifically stated otherwise, as apparent from the following discussions, it is appreciated that discussions utilizing terms such as, for example, "processing," "computing," "calculating," "determining," "establishing", "analyzing", "checking", "receiving", "selecting", "sending a request", "comparing", "enrolling", "reporting", "prompting", "storing" or the like, refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although some embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

In general, systems and methods are provided for authenticating users (e.g., customers) via voice prints. Some goods and services are promoted via fully automated channels, for example using IVR units possibly with the customers using mobile devices, involving little or no human intervention on the part of the party offering the goods or services. These fully automated channels can be referred to as "self-service" channels. Self-service channels can be popular with providers because of, for example, a limited requirement for human intervention, sometimes leading to cost reduction. Voice prints can be used to authenticate customers for such goods or services, in which case users can be prompted for passphrases.

In general, a customer can be enrolled using a text-independent voice print obtained from the customer. For example, a customer can call in to a service provider and verbally request a service by speaking an utterance. The utterance can be captured and used to create a text-independent voice print of the customer, and the customer can be enrolled with a voice print without requesting the user utter a particular phrase.

The next time the same customer calls the service provider, the service provider can prompt the customer to utter a particular passphrase. The customer can utter the passphrase, and that utterance can be compared against the previously captured text-independent voice print, e.g., via a voice analytic biometric server, to authenticate the customer. If the customer is authenticated, the passphrase utterance by the customer can be used to create a text-dependent voice print. In this manner, a passphrase and a text-dependent voice print can be created for the customer without requiring the customer to recite a particular passphrase multiple times during their initial enrollment.

When the customer requests access on subsequent visits, the passphrase presented to the customer can be different from the previous passphrase. The passphrase presented to the customer can be selected from a plurality of passphrases. The plurality of passphrases can be created from recorded parts of interactions the customer has with the system, input by the customer, input by a system administrator, generated from a random phrase generator or any combination there. The particular passphrase presented to the customer from the plurality of passphrases can be based on determining which passphrase of the plurality of passphrases has the highest likelihood of authenticating the user if the customer utters the passphrase, randomly selected, or any combination thereof. Using a varying passphrase to authenticate the customer can help to ensure that even if a fraudster records the customer's voice when the customer repeats a passphrase, that recording is likely unusable to gain access to the customer's account.

At least some of the components of the system illustrated in FIG. 1 can for example be implemented in a call center environment. As used herein "call center", otherwise known as a "contact center" can include any platform that enables two or more parties to conduct a communication session. For example, a call center can include one or more user devices that can be operated by human agents or one or more IVR units, either of which can be used to conduct a communication session with an individual.

The system can include a plurality of user devices 14 (only one is shown) that can for example be operated by agents of a call center during, before and after engaging in a communication session with an individual, one or more audio servers 16 (only one is shown) to record communication sessions, a management server 12 configured to control the enrollment and/or authentication processes, including providing one or more passphrases, an operational database 20 that includes data related to individuals and communication sessions and/or one or more passphrases, a voice biometric server 22 configured to generate voice prints of the individuals, a speech analytics server 24, and an IVR unit 26.

According to some embodiments of the invention, the speech analytics server can be configured to analyze recordings of speech by an individual; and the voice biometric server can generate a voice print for the individual based on the analyzed utterances.

It should be noted that the various servers shown in FIG. 1 can be implemented on a single computing device according to embodiments of the invention. Equally, the functions of any of the servers can be distributed across multiple computing devices. In particular, the speech analytics and voice biometrics functions need not be performed on servers. For example, they can be performed in suitably programmed processors or processing modules within any computing device.

Management server 12 can receive information from any of user device 14, from IVR unit 26, from operational database 20 and from voice biometric server 22. Voice biometric server 22 can generate voice prints from audio streams received from audio server 16. Any of audio server 16, IVR unit 26 and user device 14 can be included in a call center or contact center for conducting and recording communication sessions. According to some embodiments of the invention, management server 12 can serve the function of an applications server.

During a communication session, management server 12 can receive from user device 14 or IVR unit 26 a request to authenticate an individual. The management server 12 can provide a passphrase to the user via the user device 14 or the IVR unit 26. The passphrases can be provided via the methods as described below. After performing the authentication and while the communication session still proceeds, management server 12 can send a notification to the user device or the IVR unit 26, confirming whether or not the individual was successfully authenticated. Further, according to some embodiments of the invention, management server 12 can perform passive (seamless) authentication of individuals and control enrollment of voice prints.

Management server 12 can include an enrollment unit 122, which can also be referred to as an enrollment server, configured to control the enrollment process of new voice prints according to enrollment logic. Management server 12 can further include an enrollment engine 123 which can comprise a module responsible for managing (e.g. collecting and dispatching) enrollment requests and "feeding" the enrollment unit. Management server 12 can further include an authentication unit 124, which can also be referred to as an authentication server or an authentication manager, to control automatic and seamless authentication of the individual during the communication session.

Management server 12 can further include at least one processor 126 and at least one memory unit 128. Processor 126 can be any computer, processor or controller configured to execute commands included in a software program, for example to execute the methods disclosed herein. Enrollment manager 122 and authentication server 124 can each include or can each be in communication with processor 126. Alternatively, a single processor 126 can perform both the authentication and enrollment methods. Processor 126 can include components such as, but not limited to, one or more central processing units (CPU) or any other suitable multi-purpose or specific processors or controllers, one or more input units, one or more output units, one or more memory units, and one or more storage units. Processor 126 can additionally include other suitable hardware components and/or software components.

Memory 128 can store codes to be executed by processor 126. Memory 128 can be in communication with or can be included in processor 126. Memory 128 can include a mass storage device, for example an optical storage device such as a CD, a DVD, or a laser disk; a magnetic storage device such as a tape, a hard disk, Storage Area Network (SAN), a Network Attached Storage (NAS), or others.

According to some embodiments of the invention, management server 12 can also include monitor 121 which can listen for events and/or dispatch events to other components of the system subscribing to monitor 121, such as a client operating on a user device 14 or in IVR unit 26.

According to some embodiments of the invention, management server can additionally include a connect module 125 including a distributed cache 127, which in some embodiments can be part of memory 128. The connect module 125 can connect real time (RT) clients operating on user devices such as user device 14 or IVR unit 26 with backend components of the system such as the operational database 20 and the voice biometric server 22. The distributed cache 127 can comprise an in-memory database, used for fast data fetching in response to queries, e.g. from a user device 14 or IVR unit 26.

According to some embodiments of the invention, management server can additionally include an interaction center 129. The functions of the interaction center 129 can include managing the recording of interactions. For example the interactions center can be a module that, for example during a telephone call, interacts with the telephony switch or packet branch exchange (PBX, not shown in FIG. 1) and computer telephony integration (CTI, not shown in FIG. 1) of an individual communicating with the user of a user device 14 to obtain start and/or end of call events, metadata and audio streaming. The interaction center 129 can extract events from a call sequence and translate or convert them for storage, indexing and possibly other operations in a backend system such as operational database 20.

User device 14 can for example be operated by an agent within a contact center. For example, user device 14 can include a desktop or laptop computer in communication with the management server 12 for example via any kind of communications network. User device 14 can include a user interface 142, a processor 144 and a memory 146. User interface 142 can include any device that allows a human user to communicate with the processor. User interface 144 can include a display, a Graphical User Interface (GUI), a mouse, a keyboard, a microphone, an earphone and other devices that can allow the user to upload information to processor 144 and receive information from processor 144. Processor 144 can include or can be in communication with memory 146 that can include codes or instructions to be executed by processor 144.

According to some embodiments of the invention, user device 14 can further include a real time client 141 which can take the form of client software running on a desktop for example associated with an agent at user device 14. The real time client 141 can be configured to "listen" to events and extract information from applications running on the desktop. Examples of such events can include but are not limited to:
- the start of a communication session with an individual
- the resolving of an individual, e.g. the retrieval of information from the operational database purporting to identify the individual
- the commencement of an utterance by the individual of a predetermined phrase
- the end of the utterance of the predetermined phrase.

Similarly, in some communication sessions, the IVR unit 26 can perform some of the functions of user device 14 and therefore the IVR unit can also include a real time client performing the same functions as the real time client 141.

During a communication session, user device 14 or IVR unit 26 can receive identification information from an individual, for example, the name of the individual, a customer number associated with the individual, an ID number and/or a social security number. Additionally or alternatively, device 14 or IVR unit 26 can receive identification information related to the individual automatically from details related to the "call", for example, the telephone number from which the individual calls, or the area (PIN code) from which the individual calls. An operator of user device 14 can use user interface 144 to upload and receive information related to the identity of the individual from database 20 via management server 12. Similarly an IVR unit can retrieve such information. The individual can be asked so called know your customer "KYC" questions related to data stored in database 20. For example, the individual can be asked to provide personal details (e.g., credit card number, and/or the name of his pet) or to describe the latest actions performed (e.g., financial transactions). During the communication session, an audio segment or an audio stream can be recorded and stored in audio server 16.

Audio server 16 can include an audio recorder 162 to record the individual's voice, an audio streamer 164 to stream the recorded voice, a processor 166 to control the recording, streaming and storing of the audio stream, and a memory 168 to store code to be executed by the processor. Audio recorder 162 can include any components configured to record an audio segment (a voice of an individual) of the communication session. Processor 166 can instruct audio streamer 164 to receive audio segment from recorder 162 and stream the segment into audio streams or buffers. Audio server 16 can further include, or can be in communication with, any storage unit(s) for storing the audio stream, e.g., in an audio archives. The audio archives can include audio data (e.g., audio streams) of historical communication sessions.

Audio server 16 can, according to some embodiments of the invention, include storage center 169 configured to store historical and ongoing speech and calls of individuals, for example but not limited to calls between individuals and IVR unit 26.

Operational database 20 can include one or more databases, for example, at least one of an interaction database 202, a transaction database 204 and a voice print database 206. Interaction database 202 can store non-transactional information of individuals, such as home address, name, and work history related to individuals such as customers of a company on whose behalf a call center is operating. Voice prints for individuals can also be stored in the interaction database 202 or in a separate voice print database 206. Such non-transactional information can be provided by an individual, e.g., when opening a bank account. Furthermore, database 202 can store interaction information related to previous communication sessions conducted with the individual, such as but not limited to the time and date of the session, the duration of the session, information acquired from the individual during the session (e.g., authentication information, successful/unsuccessful authentication). Applications used in a system according to some embodiments of the invention can also be stored in operational database 20.

Transaction database 204 can include transactional information related to previous actions performed by the individual, such as actions performed by the individual (e.g., money transfer, account balance check, order checks books, order goods and services or get medical information). Each of databases 202 and 204 can include one or more storage units. In an exemplary embodiment, interaction database 202 can include data related to the technical aspects of the communication sessions (e.g., the time, date and duration of the session), a Customer relation management (CRM) database that stores personal details related to individuals or both. In some embodiments, interaction database 202 and transaction database 204 can be included in a single database. Databases 202 and 204 included in operational database 20 can include one or more mass storage devices. The storage device can be located onsite where the audio segments or some of them are captured, or in a remote location. The capturing or the storage components can serve one or more sites of a multi-site organization.

Audio or voice recordings recorded, streamed and stored in audio server 16 can be processed by voice biometric server 22. Voice biometric server 22 can include one or more processors 222 and one or more memories 224. Processor 222 can include or can control any voice biometric engine known in the art, for example, the voice biometric engine by Nice Ltd. to generate a voice print (e.g., voice biometric data) of at least one audio stream received from audio server 16. The voice print can include one or more parameters associated with the voice of the individual. Processor 222 can include or can control any platform known in the art, for example the platform by Nice Ltd, for processing (e.g., identifying and comparing) voice prints generated from two or more audio streams. When an audio stream associated with an individual is a candidate for enrollment, voice biometric server 22 can receive from management server 12 verification of the identity of the individual. Following the verification, voice biometric server 22 can generate a voice print of the audio stream related to the individual. Processor 222 can further be configured to compare the generated voice print to other voice prints previously enrolled and stored, for example, in one or more storage units associated with voice biometric server 22. The storage units associated with voice biometric server 22 can include voice prints stored at a potential fraudster list (i.e., watch list, black list, etc.), voice prints related to the individual that were enrolled following previous communication sessions with the individual, and/or voice prints related or associated with other individuals. Memory 224 can include codes or instructions to be executed by processor 222. In some embodiments, memories 146, 168 or 224 can include the same elements disclosed with respect to memory 128.

Speech analytics server 24, similarly to voice biometric server 22, can comprise one or more processors, such as processor 242 and memory 246.

Figure 2A:
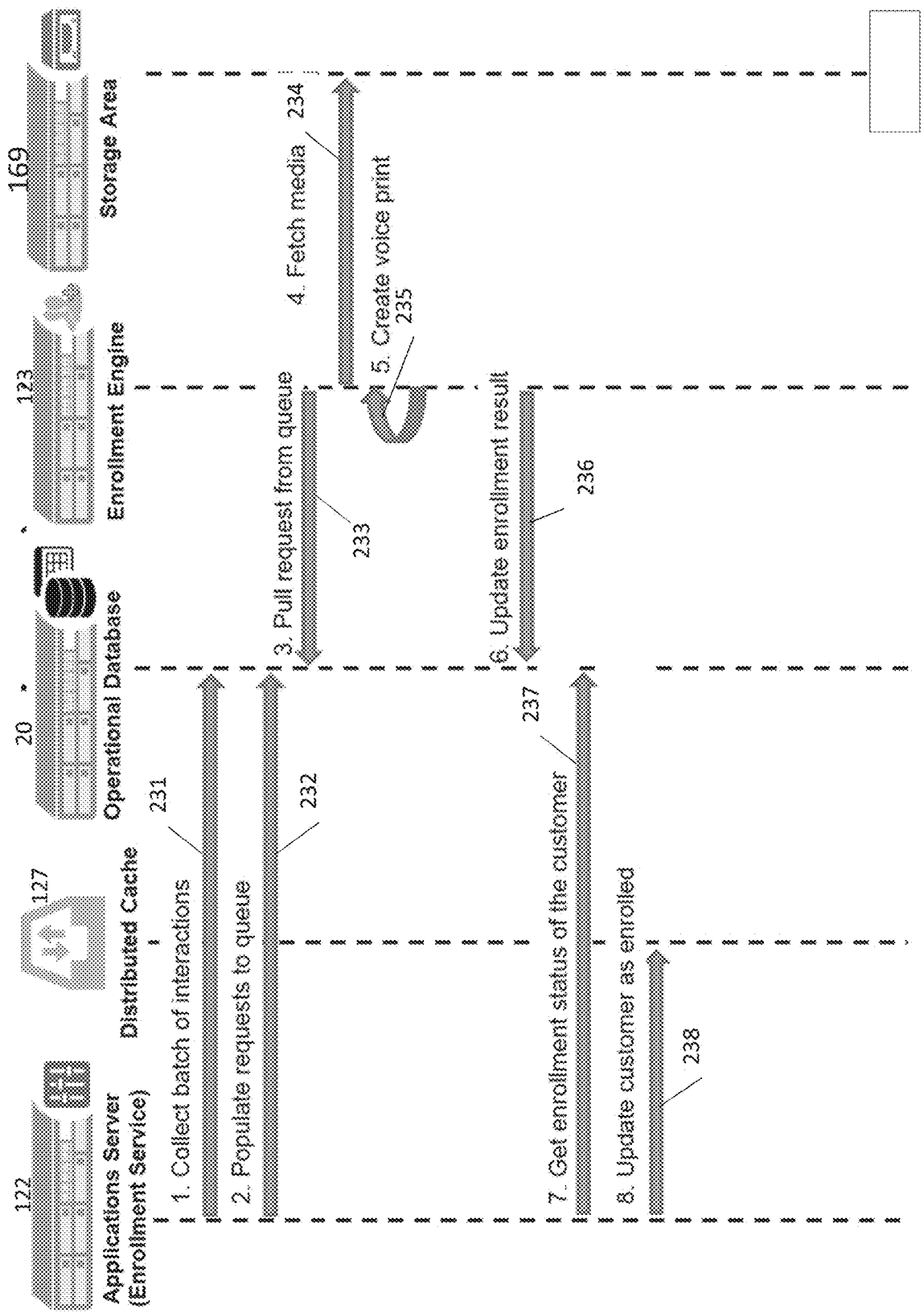
FIGS. 2A and 2B are sequence diagrams for voice authentication of a customer in a self-service system according to some embodiments of the present invention.
Figure 2B:
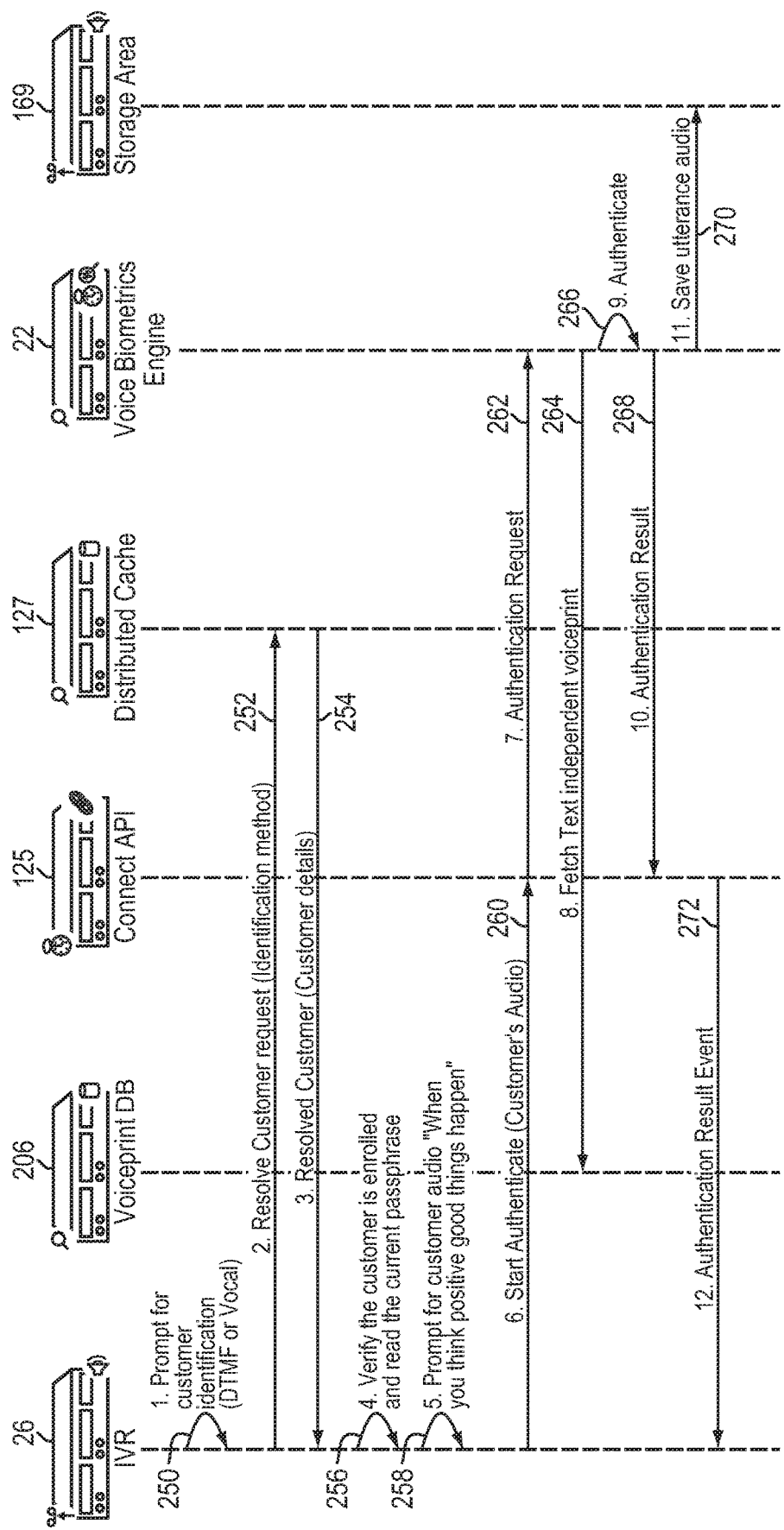

FIGS. 2A and 2B are sequence diagrams for transforming a text-independent enrollment of a customer in a self-service system into a text-dependent enrollment according to some embodiments of the present invention. These embodiments take the example of a customer calling a call center. Some embodiments of the invention may use a similar sequence of events for other kinds of individuals participating in other kinds of communication sessions.

When a call or other voice interaction is initiated, the enrollment unit 122 can fetch a batch of recorded interactions 231 (e.g., a pre-defined number of recorded calls per customer that can be used to create a voice print). The batch of recorded interactions can be filtered according to one or more parameters (e.g., call duration, agent name/identification, level of authority of the agent and/or any other business data based filter) to, for example, add an additional layer of security.

The enrollment unit 122 can transmit a request for enrollment of a customer 232 to a queue of the operational database 20. The enrollment engine 123 can fetch the request for enrollment 233 from the operation database 20. The enrollment engine 123 can fetch media 234 (e.g., a recorded interaction) from the storage center 169. For example, the enrollment engine 123 can fetch one or more recordings of interactions for a customer identifier that is the same as the customer seeking enrollment.

The enrollment engine 123 creates a voice print 235. The enrollment engine can use a voice biometrics engine (e.g., voice biometrics server 22, as described above). The voice print is a text-independent voice print because it is based on audio recordings of the customer that are utterances of the customer made without being prompted with one or more passphrases.

The enrollment engine 123 transmits the enrollment results 236 to the operational database 20. The enrollment unit 122 fetches an enrollment status of the customer 237 from the operational database 20. The enrollment unit 122 transmits an update 238 to the distributed cache 127 indicating that the customer is enrolled.

When a subsequent call by the same customer or other voice interaction is initiated, the IVR 26 prompts the customer initiating the call or interaction with an identification request 250. The identification request can be a request for a vocal response or a request for a dual tone multi frequency (DTMF) response (e.g., the customer input is from touch keys).

The IVR 26 can transmit a request to resolve the customer's request 252 to the distributed cache 127 including the customer identifier. The distributed cache 127 can hold metadata related to the customer and/or one or more passphrases. The metadata can include an enrollment status, last successful authentication date and time, an internal identifier, or any combination thereof.

The distributed cache 127 can transmit a response to the request to resolve the customer's request 254 including the metadata to the IVR 26.

The IVR 26 can verify that the customer is enrolled and read one passphrase of a plurality of passphrases 256 based on the metadata. The IVR 26 can prompt 258 the customer for the passphrase (e.g., "when you think positive things, good things happen"). The IVR 26 can record the customer's response to the prompt (e.g., an utterance of the customer recorded into an audio file).

The IVR 26 can transmit a request to start authentication 260 with the customer's audio response to the connect module 125. The connect module 125 can transmit an authentication request 262 to the voice biometrics server 22.

The voice biometrics server 22 can fetch a text-independent voice print of the customer 264 (e.g., a text-independent voice print passively created during an initial enrollment of the customer). The voice biometrics server 22 can authenticate 266 the customer by determining if the customer's audio response to the prompt is sufficiently matched to the text-independent voice print.

The voice biometrics server 22 can transmit the authentication results 268 to the connect module 125. If the customer is authenticated, the voice biometrics server 22 can create a text-dependent voice print (e.g., a voice print for the particular passphrase) for the customer from the customer's audio response, and transmit 270 the text-dependent voice print to the storage area 169 for saving. In this manner, a text-dependent voiceprint of passphrases for a customer can be passively created. In some embodiments, if a text-dependent voice print of the passphrase exists for the customer prior to the current interaction, then the existing text-dependent voice print of the customer is updated with the voice print for the current interaction.

The connect module 125 can transmit the authentication results 272 to the IVR 26.

FIG. 3 is a flow chart for a method for transforming a text-independent enrollment of a customer in a self-service system into a text-dependent enrollment, according to some embodiments of the invention.

The method involves receiving a request for authentication of the customer (Step 310). The request can include one or more pieces of information that identify the customer. For example, the one or more pieces of information can include a customer identification, a device identifier, a phone number, an address of the customer, or any combination thereof.

The method can include determining whether the customer is enrolled in the self-service system with a text-independent voice print (Step 315). If the customer is not enrolled in the self-service system, then the method can involve performing a text-independent enrollment (Step 320) (e.g., as shown above in the sequence of FIG. 2a).

If the customer is enrolled in the self-service system, then the method can involve determining a passphrase from a plurality of passphrase (e.g., a group of passphrases) request of the customer (Step 325). The passphrase presented to the customer can be selected from a plurality of passphrases. Each passphrase in the plurality of passphrases can be a topic (e.g., pets name, full name, national identification number, first address), or a pre-defined statement (e.g., "Wellington is the capital of New Zealand," "Zero One Two Three Four Five Six Seven Eight Nine," or "When you think positive good things happen").

The plurality of passphrases can be created from recorded parts of interactions the customer has with the system. For example, if during one or more interaction with the system the customer has uttered a phrase having more than n words, the phrase can be used to create a passphrase. The number of words n can be based number of phenomes that can be used to create a phrase having sufficient ability to be voice recognized. For example, if the user utters "Good Morning, this is Tammi Wellington, I would like to transfer money to my friend's account . . . ," the passphrase can be "Good Morning, this is Tammi Wellington."

In various embodiments, the plurality of passphrases are input by the customer, input by a system administrator, generated from a random phrase generator or any combination thereof.

In some embodiments, the same passphrase is presented to the customer for a predefined number of subsequent interactions before being changed. In various embodiments, the passphrase is changed every interaction, every n interactions (where n is a whole number), randomly, or any combination thereof.

In some embodiments, subsets of the plurality of passphrases is assigned to each customer as the available passphrases for that particular customer for a time duration (e.g., 3 weeks), and then once the time duration is reached, a different subset of the plurality of passphrases is assigned to respective customers. In some embodiments, the plurality of passphrases is discarded and repopulated with different passphrases after a time duration (e.g., once daily, weekly, monthly, yearly, or any combination thereof).

In some embodiments, when more than a percentage of the plurality of passphrases is used for all of the customers then the plurality of passphrases is replaced by new passphrases. The new passphrases can be determined based on any computerized content that includes text. For example, electronic books, web pages, .pdf documents, and/or power point presentations. The new passphrases can be selected from text wherein the selected text is determined to be sufficient for self-service biometrics. For example, text that contains word combinations that are not typically spoken in everyday conversation, text that has an estimated spoken duration of not less than ~4 seconds, and/or text that has a high number of phonemes, with at least two repeated.

In some embodiments, the particular passphrase presented to the customer from the plurality of passphrases is based on which passphrase of the plurality of passphrases has the highest likelihood of authenticating the customer if the customer utters the passphrase (e.g., a passphrase having a corresponding text-dependent voice print can have a higher likelihood of authenticating the customer than a passphrase that was randomly generated and thus the customer's response is compared against a text-dependent voice print). The passphrase of the plurality of passphrases having the highest likelihood of authenticating the customer can be determined by comparing each passphrase of the plurality of passphrases to a text-dependent or a text-independent voice print based on voice biometrics, as is known in the art. In some embodiments, if multiple passphrases have the highest likelihood of authenticating the customer, then the multiple passphrases can be selected.

In some embodiments, if a particular passphrase of the plurality of passphrases is selected as being the most likely to authenticate the customer more than a predetermined number of times in a row, it can be excluded from being the selected passphrase (e.g., for a predetermined number of subsequent authentications). The predetermined number of times in a row the passphrase can be selected can be one to ten. The predetermined number of subsequent authentications can be one to ten.

In some embodiments, the particular passphrase presented to the customer is randomly selected.

Using a varying passphrase to authenticate the customer can help to ensure that even if a fraudster records the customer's voice when the customer repeats a passphrase, that recording is likely unusable to gain access to the customer's account.

The method can also involve transmitting the request to the customer to repeat the passphrase (Step 330).

The method can also involve receiving an audio stream of the passphrase (Step 335). The audio stream can be a recording of the customer uttering the passphrase.

The method can also involve authenticating the customer by comparing the audio stream of the passphrase against a voice print of the customer (Step 340). The authentication can be based on comparing the received audio against a text-dependent voice print (if one exists) or based on comparing the received audio against a text-independent voice print.

In some embodiments, upon subsequent calls by the same customer, even though the customer already has a text-independent and text-dependent voice print, the passphrase the customer recites is used to update and/or improve the text-dependent voice print. For example, if a duration threshold (e.g., 3 weeks, 3 months, or 1 year) has passed since the customer's last contact, then the text-dependent voice print can be completely replaced. In some embodiments, a text-dependent passphrase is updated by combining the current passphrase utterance of the customer (e.g., as is known in the art).

If the customer is authenticated, then the method can involve creating (or updating) a text-dependent voice print based on the passphrase (Step 345). In some embodiments, the text-dependent voice print is created (or updated) after the customer stops using the self-service system.

If the customer is not authenticated, then the method can involve discarding the audio stream of the passphrase (Step 350).

Different embodiments are disclosed herein. Features of certain embodiments can be combined with features of other embodiments; thus certain embodiments can be combinations of features of multiple embodiments.

Embodiments of the invention can include an article such as a computer or processor readable non-transitory storage medium, such as for example a memory, a disk drive, or a USB flash memory device encoding, including or storing instructions, e.g., computer-executable instructions, which when executed by a processor or controller, cause the processor or controller to carry out methods disclosed herein.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A computer-implemented method for voice authentication of a customer in a self-service system, the computer implemented method comprising:

creating a plurality of passphrases from recorded parts of prior interactions of the customer with the self-service system, the interactions comprising phrases the user has uttered, the phrases having more than n words, where n is based on the number of phonemes that can be used to create a phrase having a sufficient ability to be voice recognized by a voice biometric model;

receiving a request for authentication of the customer, the customer is enrolled in the self-service system with a text-independent voice print;

determining a passphrase from the plurality of passphrases to transmit to the customer based on comparing each of the plurality of passphrases to a text-dependent or text-independent voice biometric model;

transmitting a request to the customer to repeat the passphrase;

receiving an audio stream of the passphrase;

authenticating the customer by comparing the audio stream of the passphrase against the text-independent voice print; and if the customer is authenticated, then storing the audio stream of the passphrase.

2. The computer-implemented method of claim 1 comprising upon receipt of a subsequent request for authentication of the customer, determining another passphrase that is different from the previous passphrase.

3. The computer-implemented method of claim 1 further comprising:
   for each subsequent request for authentication, presenting the customer with a unique passphrase of the plurality of passphrases; and
   storing an audio stream of each corresponding unique passphrase as recited by the customer.

4. The computer-implemented method of claim 1 wherein determining the passphrase further comprises selecting the passphrase from the plurality of passphrases such that the same passphrase is not used more than a minimum number of reuse times.

5. The computer-implemented method of claim 1 wherein determining the passphrase further comprising combining two or more passphrases from the plurality of passphrases.

6. The computer-implemented method of claim 1 further comprising for each passphrase in the plurality of passphrases that is transmitted to the customer a maximum number of use times, deleting the corresponding passphrases from the plurality of passphrases.

7. The computer-implemented method of claim 1 wherein the plurality of passphrases is input by a user.

8. The computer-implemented method of claim 1 wherein the plurality of passphrases is automatically populated.

9. The computer-implemented method of claim 1 wherein the plurality of passphrases is updated.

10. The computer-implemented method of claim 1 wherein the plurality of passphrases is updated when more than a predefined percentage of customers of a system that executed the method are enrolled with the same passphrases.

11. The computer-implemented method of claim 10 wherein updating the plurality of passphrases is based on computerized text.

12. The computer-implement method of claim 1 wherein the plurality of passphrases are generated by a random phrase generator.

13. The computer-implemented method of claim 1 wherein the passphrase that is selected from the plurality of passphrases has a higher likelihood of causing the customer to be authenticated in comparison to a random passphrase.

* * * * *